(12) United States Patent
Wang

(10) Patent No.: US 8,587,595 B2
(45) Date of Patent: Nov. 19, 2013

(54) LOW POWER MULTI-CORE DECODER SYSTEM AND METHOD

(75) Inventor: Ynjiun P. Wang, Cupertino, CA (US)

(73) Assignee: Hand Held Products, Inc., Fort Mill, SC (US)

( * ) Notice: Subject to any disclaimer, the term of this patent is extended or adjusted under 35 U.S.C. 154(b) by 140 days.

(21) Appl. No.: 12/571,911

(22) Filed: Oct. 1, 2009

(65) Prior Publication Data

US 2011/0080414 A1   Apr. 7, 2011

(51) Int. Cl.
  *G06F 15/80*   (2006.01)
  *G06K 7/10*   (2006.01)

(52) U.S. Cl.
  USPC .............. 345/505; 235/462.01; 235/462.1

(58) Field of Classification Search
  USPC .............. 345/501, 502, 505, 530, 554, 557;
      235/462.01, 462.09, 462.1, 462.11;
      718/105
  See application file for complete search history.

(56) References Cited

U.S. PATENT DOCUMENTS

| | | |
|---|---|---|
| 3,582,884 A | 6/1971 | Shepard |
| 3,663,762 A | 5/1972 | Joel, Jr. |
| 3,684,868 A | 8/1972 | Christie et al. |
| 3,723,970 A | 3/1973 | Stoller |
| 3,906,166 A | 9/1975 | Cooper et al. |
| 4,004,237 A | 1/1977 | Kratzer |
| 4,041,391 A | 8/1977 | Deerkoski |
| 4,097,847 A | 6/1978 | Forsen et al. |
| 4,114,155 A | 9/1978 | Raab |
| 4,164,628 A | 8/1979 | Ward et al. |
| 4,210,802 A | 7/1980 | Sakai |
| 4,291,410 A | 9/1981 | Caples et al. |
| 4,315,245 A | 2/1982 | Nakahara et al. |
| 4,435,822 A | 3/1984 | Spencer et al. |
| 4,445,118 A | 4/1984 | Taylor et al. |
| 4,488,678 A | 12/1984 | Hara et al. |
| 4,488,679 A | 12/1984 | Bockholt et al. |
| 4,500,776 A | 2/1985 | Laser |
| 4,538,060 A | 8/1985 | Sakai et al. |
| 4,542,528 A | 9/1985 | Sanner et al. |
| 4,561,089 A | 12/1985 | Rouse et al. |
| 4,570,057 A | 2/1986 | Chadima, Jr. et al. |
| 4,610,359 A | 9/1986 | Muller et al. |
| 4,628,532 A | 12/1986 | Stone et al. |
| 4,636,624 A | 1/1987 | Ishida et al. |
| 4,639,932 A | 1/1987 | Schiff |
| 4,644,523 A | 2/1987 | Horwitz |
| 4,646,353 A | 2/1987 | Tenge et al. |
| 4,653,076 A | 3/1987 | Jerrim et al. |
| 4,686,363 A | 8/1987 | Schoon |

(Continued)

FOREIGN PATENT DOCUMENTS

JP   59212075 A   * 11/1984

OTHER PUBLICATIONS

EPO, European Search Report from corresponding EP application No. EP 10 182186, dated Jan. 11, 2011, (3 pages).

*Primary Examiner* — Joni Richer
(74) *Attorney, Agent, or Firm* — Additon, Higgins, Pendleton & Ashe, P.A.

(57) ABSTRACT

A portable data terminal including a multi-core processor having at least a first core and a second core, at least one illumination assembly and at least one imaging assembly and data storage means configured to store a plurality of program instructions, the program instructions including at least one one-dimensional decoder and at least one two-dimensional decoder.

19 Claims, 5 Drawing Sheets

(56) References Cited

U.S. PATENT DOCUMENTS

| | | |
|---|---|---|
| 4,690,530 A | 9/1987 | Fujino et al. |
| 4,710,817 A | 12/1987 | Ando et al. |
| 4,785,463 A | 11/1988 | Janc et al. |
| 4,791,446 A | 12/1988 | Ishida et al. |
| 4,794,239 A | 12/1988 | Allais |
| 4,807,256 A | 2/1989 | Holmes et al. |
| 4,818,856 A | 4/1989 | Matsushima et al. |
| 4,825,058 A | 4/1989 | Poland |
| 4,841,544 A | 6/1989 | Nuytkens |
| 4,874,936 A | 10/1989 | Chandler et al. |
| 4,877,949 A | 10/1989 | Danielson et al. |
| 4,896,029 A | 1/1990 | Chandler et al. |
| 4,901,073 A | 2/1990 | Kibrick |
| 4,908,500 A | 3/1990 | Baumberger et al. |
| 4,942,474 A | 7/1990 | Akimoto et al. |
| 4,998,010 A | 3/1991 | Chandler et al. |
| 5,001,560 A | 3/1991 | Ericsson |
| 5,019,699 A | 5/1991 | Koenck |
| 5,113,445 A | 5/1992 | Wang |
| 5,138,140 A | 8/1992 | Siemiatkowski et al. |
| 5,153,418 A | 10/1992 | Batterman et al. |
| 5,153,421 A | 10/1992 | Tandon et al. |
| 5,155,343 A | 10/1992 | Chandler et al. |
| 5,159,340 A | 10/1992 | Smith |
| 5,189,292 A | 2/1993 | Batterman et al. |
| 5,212,777 A | 5/1993 | Gove et al. |
| 5,223,701 A | 6/1993 | Batterman et al. |
| 5,227,614 A | 7/1993 | Danielson et al. |
| 5,235,167 A | 8/1993 | Dvorkis et al. |
| 5,237,163 A | 8/1993 | Collins et al. |
| 5,245,695 A | 9/1993 | Basehore |
| 5,262,871 A | 11/1993 | Wilder et al. |
| 5,272,323 A | 12/1993 | Martino |
| 5,276,842 A | 1/1994 | Sugita |
| 5,278,397 A | 1/1994 | Barkan et al. |
| 5,286,960 A | 2/1994 | Longacre, Jr. et al. |
| 5,294,783 A | 3/1994 | Hammond, Jr. et al. |
| 5,304,786 A | 4/1994 | Pavlidis et al. |
| 5,304,787 A | 4/1994 | Wang |
| 5,311,001 A | 5/1994 | Joseph et al. |
| 5,313,533 A | 5/1994 | Scott |
| 5,319,185 A | 6/1994 | Obata |
| 5,327,441 A | 7/1994 | Kawazoe et al. |
| 5,331,176 A | 7/1994 | Sant' Anselmo et al. |
| 5,343,028 A | 8/1994 | Figarella et al. |
| 5,345,266 A | 9/1994 | Denyer |
| 5,354,977 A | 10/1994 | Roustaei |
| 5,378,881 A | 1/1995 | Adachi et al. |
| 5,378,883 A | 1/1995 | Batterman et al. |
| 5,392,447 A | 2/1995 | Schlack et al. |
| 5,396,054 A | 3/1995 | Krichever et al. |
| 5,399,852 A | 3/1995 | Zheng et al. |
| 5,401,949 A | 3/1995 | Ziemacki et al. |
| 5,412,197 A | 5/1995 | Smith |
| 5,414,251 A | 5/1995 | Durbin |
| 5,418,862 A | 5/1995 | Zheng et al. |
| 5,420,409 A | 5/1995 | Longacre, Jr. et al. |
| 5,422,470 A | 6/1995 | Kubo et al. |
| 5,428,211 A | 6/1995 | Zheng et al. |
| 5,430,286 A | 7/1995 | Hammond, Jr. et al. |
| 5,430,472 A | 7/1995 | Curry |
| 5,446,271 A | 8/1995 | Cherry et al. |
| 5,461,425 A | 10/1995 | Fowler et al. |
| 5,463,214 A | 10/1995 | Longacre, Jr. et al. |
| 5,471,515 A | 11/1995 | Fossum et al. |
| 5,471,592 A | 11/1995 | Gove et al. |
| 5,477,042 A | 12/1995 | Wang |
| 5,478,997 A | 12/1995 | Bridgelall et al. |
| 5,478,999 A | 12/1995 | Figarella et al. |
| 5,479,515 A | 12/1995 | Longacre, Jr. |
| 5,481,098 A | 1/1996 | Davis et al. |
| 5,487,115 A | 1/1996 | Surka |
| 5,489,769 A | 2/1996 | Kubo et al. |
| 5,502,297 A | 3/1996 | Sherman |
| 5,504,524 A | 4/1996 | Lu et al. |
| 5,512,739 A | 4/1996 | Chandler et al. |
| 5,517,018 A | 5/1996 | Zheng et al. |
| 5,521,366 A | 5/1996 | Wang et al. |
| 5,524,068 A | 6/1996 | Kacandes et al. |
| 5,537,431 A | 7/1996 | Chen et al. |
| 5,545,886 A | 8/1996 | Metlitsky et al. |
| 5,565,669 A | 10/1996 | Liu |
| 5,567,934 A | 10/1996 | Zheng et al. |
| 5,569,901 A | 10/1996 | Bridgelall et al. |
| 5,572,006 A | 11/1996 | Wang et al. |
| 5,585,616 A | 12/1996 | Roxby et al. |
| 5,591,955 A | 1/1997 | Laser |
| 5,591,956 A | 1/1997 | Longacre, Jr. et al. |
| 5,598,007 A | 1/1997 | Bunce et al. |
| 5,600,119 A | 2/1997 | Dvorkis et al. |
| 5,610,387 A | 3/1997 | Bard et al. |
| 5,612,524 A | 3/1997 | Sant' Anselmo et al. |
| 5,621,203 A | 4/1997 | Swartz et al. |
| 5,637,849 A | 6/1997 | Wang et al. |
| 5,638,465 A | 6/1997 | Sano et al. |
| 5,640,202 A | 6/1997 | Kondo et al. |
| 5,663,549 A | 9/1997 | Katz et al. |
| 5,665,959 A | 9/1997 | Fossum et al. |
| 5,666,167 A | 9/1997 | Tults |
| 5,668,803 A | 9/1997 | Tymes et al. |
| 5,672,858 A | 9/1997 | Li et al. |
| 5,698,833 A | 12/1997 | Skinger |
| 5,699,447 A | 12/1997 | Alumot et al. |
| 5,702,059 A | 12/1997 | Chu et al. |
| 5,703,349 A | 12/1997 | Meyerson et al. |
| 5,710,417 A | 1/1998 | Joseph et al. |
| 5,723,823 A | 3/1998 | Bell |
| 5,723,853 A | 3/1998 | Longacre, Jr. et al. |
| 5,723,868 A | 3/1998 | Hammond, Jr. et al. |
| 5,726,435 A | 3/1998 | Hara et al. |
| 5,739,518 A | 4/1998 | Wang |
| 5,756,981 A | 5/1998 | Roustaei et al. |
| 5,763,864 A | 6/1998 | O'Hagan et al. |
| 5,773,806 A | 6/1998 | Longacre, Jr. |
| 5,773,810 A | 6/1998 | Hussey et al. |
| 5,774,357 A | 6/1998 | Hoffberg et al. |
| 5,780,832 A | 7/1998 | Watanabe et al. |
| 5,780,834 A | 7/1998 | Havens et al. |
| 5,783,811 A | 7/1998 | Feng et al. |
| 5,784,102 A | 7/1998 | Hussey et al. |
| 5,811,774 A | 9/1998 | Ju et al. |
| 5,811,784 A | 9/1998 | Tausch et al. |
| 5,814,801 A | 9/1998 | Wang et al. |
| 5,814,803 A | 9/1998 | Olmstead et al. |
| 5,815,200 A | 9/1998 | Ju et al. |
| 5,818,028 A | 10/1998 | Meyerson et al. |
| 5,818,528 A | 10/1998 | Roth et al. |
| 5,825,006 A | 10/1998 | Longacre, Jr. et al. |
| 5,831,254 A | 11/1998 | Karpen et al. |
| 5,831,674 A | 11/1998 | Ju et al. |
| 5,841,121 A | 11/1998 | Koenck |
| 5,841,126 A | 11/1998 | Fossum et al. |
| 5,867,594 A | 2/1999 | Cymbalski |
| 5,867,595 A | 2/1999 | Cymbalski |
| 5,875,108 A | 2/1999 | Hoffberg et al. |
| 5,877,487 A | 3/1999 | Tani et al. |
| 5,900,613 A | 5/1999 | Koziol et al. |
| 5,914,476 A | 6/1999 | Gerst, III et al. |
| 5,917,171 A | 6/1999 | Sasai et al. |
| 5,917,945 A | 6/1999 | Cymbalski |
| 5,920,477 A | 7/1999 | Hoffberg et al. |
| 5,926,214 A | 7/1999 | Denyer et al. |
| 5,929,418 A | 7/1999 | Ehrhart et al. |
| 5,932,862 A | 8/1999 | Hussey et al. |
| 5,942,741 A | 8/1999 | Longacre, Jr. et al. |
| 5,949,052 A | 9/1999 | Longacre, Jr. et al. |
| 5,949,054 A | 9/1999 | Karpen et al. |
| 5,949,056 A | 9/1999 | White |
| 5,962,838 A | 10/1999 | Tamburrini |
| 5,965,863 A | 10/1999 | Parker et al. |
| 5,979,763 A | 11/1999 | Wang et al. |
| 5,979,768 A | 11/1999 | Koenck |
| 5,984,186 A | 11/1999 | Tafoya |
| 5,986,297 A | 11/1999 | Guidash et al. |

(56) References Cited

U.S. PATENT DOCUMENTS

| | | |
|---|---|---|
| 6,003,008 A | 12/1999 | Postrel et al. |
| 6,012,640 A | 1/2000 | Liu |
| 6,017,496 A | 1/2000 | Nova et al. |
| 6,019,286 A | 2/2000 | Li et al. |
| 6,053,407 A | 4/2000 | Wang et al. |
| 6,064,763 A | 5/2000 | Maltsev |
| 6,070,800 A | 6/2000 | Fujita et al. |
| 6,082,619 A | 7/2000 | Ma et al. |
| 6,082,621 A | 7/2000 | Chan et al. |
| 6,094,739 A | 7/2000 | Miller et al. |
| 6,119,179 A | 9/2000 | Whitridge et al. |
| 6,123,264 A | 9/2000 | Li et al. |
| 6,129,278 A | 10/2000 | Wang et al. |
| 6,144,453 A | 11/2000 | Hallerman et al. |
| 6,152,368 A | 11/2000 | Olmstead et al. |
| 6,155,491 A | 12/2000 | Dueker et al. |
| 6,161,760 A | 12/2000 | Marrs et al. |
| 6,170,749 B1 | 1/2001 | Goren et al. |
| 6,173,894 B1 | 1/2001 | Olmstead et al. |
| 6,176,428 B1 | 1/2001 | Joseph et al. |
| 6,176,429 B1 | 1/2001 | Reddersen et al. |
| 6,179,208 B1 | 1/2001 | Feng |
| 6,186,404 B1 | 2/2001 | Ehrhart et al. |
| 6,215,992 B1 | 4/2001 | Howell et al. |
| 6,219,182 B1 | 4/2001 | McKinley |
| 6,230,975 B1 | 5/2001 | Colley et al. |
| 6,264,105 B1 | 7/2001 | Longacre, Jr. et al. |
| 6,276,605 B1 | 8/2001 | Olmstead et al. |
| 6,311,895 B1 | 11/2001 | Olmstead et al. |
| 6,315,204 B1 | 11/2001 | Knighton et al. |
| 6,329,139 B1 | 12/2001 | Nova et al. |
| 6,347,163 B2 | 2/2002 | Roustaei |
| 6,360,948 B1 | 3/2002 | Yang et al. |
| 6,371,373 B1 | 4/2002 | Ma et al. |
| 6,385,352 B1 | 5/2002 | Roustaei |
| 6,398,112 B1 | 6/2002 | Li et al. |
| 6,429,934 B1 | 8/2002 | Dunn et al. |
| 6,443,360 B1 | 9/2002 | Marchi et al. |
| 6,462,842 B1 | 10/2002 | Hamilton |
| 6,486,911 B1 | 11/2002 | Denyer et al. |
| 6,491,223 B1 | 12/2002 | Longacre, Jr. et al. |
| 6,493,029 B1 | 12/2002 | Denyer et al. |
| 6,505,778 B1 | 1/2003 | Reddersen et al. |
| 6,508,404 B2 | 1/2003 | Hecht |
| 6,512,218 B1 | 1/2003 | Canini et al. |
| 6,525,827 B2 | 2/2003 | Liu |
| 6,547,139 B1 | 4/2003 | Havens et al. |
| 6,547,142 B1 | 4/2003 | Goren et al. |
| 6,552,323 B2 | 4/2003 | Guidash et al. |
| 6,552,746 B1 | 4/2003 | Yang et al. |
| 6,565,003 B1 | 5/2003 | Ma |
| 6,575,367 B1 | 6/2003 | Longacre, Jr. |
| 6,578,766 B1 | 6/2003 | Parker et al. |
| 6,585,159 B1 | 7/2003 | Meier et al. |
| 6,598,797 B2 | 7/2003 | Lee |
| 6,606,171 B1 | 8/2003 | Renk et al. |
| 6,634,558 B1 | 10/2003 | Patel et al. |
| 6,637,658 B2 | 10/2003 | Barber et al. |
| 6,655,595 B1 | 12/2003 | Longacre, Jr. et al. |
| 6,661,521 B1 | 12/2003 | Stern |
| 6,665,012 B1 | 12/2003 | Yang et al. |
| 6,666,377 B1 | 12/2003 | Harris |
| 6,672,511 B1 | 1/2004 | Shellhammer |
| 6,678,412 B1 | 1/2004 | Shigekusa et al. |
| 6,685,095 B2 | 2/2004 | Roustaei et al. |
| 6,698,656 B2 | 3/2004 | Parker et al. |
| 6,714,239 B2 | 3/2004 | Guidash |
| 6,714,665 B1 | 3/2004 | Hanna et al. |
| 6,722,569 B2 | 4/2004 | Ehrhart et al. |
| 6,729,546 B2 | 5/2004 | Roustaei |
| 6,732,929 B2 | 5/2004 | Good et al. |
| 6,732,930 B2 | 5/2004 | Massieu et al. |
| 6,736,321 B2 | 5/2004 | Tsikos et al. |
| 6,739,511 B2 | 5/2004 | Tsikos et al. |
| 6,742,707 B1 | 6/2004 | Tsikos et al. |
| 6,814,290 B2 | 11/2004 | Longacre |
| 6,832,729 B1 | 12/2004 | Perry et al. |
| 6,834,806 B2 | 12/2004 | Benedetti et al. |
| 6,837,432 B2 | 1/2005 | Tsikos et al. |
| 6,854,649 B2 | 2/2005 | Worner et al. |
| 6,857,570 B2 | 2/2005 | Tsikos et al. |
| 6,858,159 B2 | 2/2005 | Lyons |
| 6,860,428 B1 | 3/2005 | Dowling et al. |
| 6,863,216 B2 | 3/2005 | Tsikos et al. |
| 6,877,665 B2 | 4/2005 | Challa et al. |
| 6,982,800 B1 | 1/2006 | Cavill et al. |
| 7,055,747 B2 | 6/2006 | Havens et al. |
| 7,059,525 B2 | 6/2006 | Longacre et al. |
| 7,077,317 B2 | 7/2006 | Longacre, Jr. et al. |
| 7,077,321 B2 | 7/2006 | Longacre, Jr. et al. |
| 7,080,786 B2 | 7/2006 | Longacre, Jr. et al. |
| 7,086,596 B2 | 8/2006 | Meier et al. |
| 7,090,132 B2 | 8/2006 | Havens et al. |
| 7,093,147 B2 | 8/2006 | Farkas et al. |
| D528,146 S | 9/2006 | Fitch |
| 7,104,456 B2 | 9/2006 | Parker et al. |
| 7,261,238 B1 | 8/2007 | Carlson et al. |
| 7,270,273 B2 | 9/2007 | Barber et al. |
| 7,349,285 B2 | 3/2008 | Balasubramanian et al. |
| 7,540,424 B2 | 6/2009 | Knowles et al. |
| 7,571,284 B1 * | 8/2009 | Olson et al. .................. 711/122 |
| 7,852,519 B2 | 12/2010 | Meier et al. |
| 2002/0035715 A1 | 3/2002 | Hatakeyama |
| 2002/0039099 A1 | 4/2002 | Harper |
| 2002/0039197 A1 | 4/2002 | Hikichi |
| 2002/0039457 A1 | 4/2002 | Helms et al. |
| 2002/0135683 A1 | 9/2002 | Tamama et al. |
| 2002/0145043 A1 | 10/2002 | Challa et al. |
| 2002/0158127 A1 | 10/2002 | Hori et al. |
| 2003/0042311 A1 | 3/2003 | Longacre et al. |
| 2003/0062418 A1 | 4/2003 | Barber et al. |
| 2003/0085282 A1 | 5/2003 | Parker et al. |
| 2003/0136843 A1 | 7/2003 | Ralph et al. |
| 2003/0146283 A1 | 8/2003 | Longacre et al. |
| 2003/0218067 A1 | 11/2003 | Parker et al. |
| 2004/0004128 A1 | 1/2004 | Pettinelli et al. |
| 2004/0094627 A1 | 5/2004 | Parker et al. |
| 2004/0195332 A1 | 10/2004 | Barber et al. |
| 2004/0206821 A1 | 10/2004 | Longacre et al. |
| 2004/0256464 A1 | 12/2004 | Longacre et al. |
| 2004/0256465 A1 | 12/2004 | Longacre |
| 2004/0262392 A1 | 12/2004 | Longacre et al. |
| 2004/0262394 A1 | 12/2004 | Longacre et al. |
| 2004/0262395 A1 | 12/2004 | Longacre et al. |
| 2004/0262396 A1 | 12/2004 | Longacre et al. |
| 2004/0262399 A1 | 12/2004 | Longacre et al. |
| 2005/0056699 A1 | 3/2005 | Meier et al. |
| 2005/0103851 A1 | 5/2005 | Zhu et al. |
| 2005/0161511 A1 | 7/2005 | Parker et al. |
| 2006/0026447 A1 | 2/2006 | Naveh et al. |
| 2006/0054704 A1 | 3/2006 | Fitch et al. |
| 2006/0097054 A1 | 5/2006 | Biss et al. |
| 2006/0126129 A1 | 6/2006 | Barber et al. |
| 2006/0175413 A1 | 8/2006 | Longacre et al. |
| 2006/0255150 A1 | 11/2006 | Longacre |
| 2006/0259799 A1 * | 11/2006 | Melpignano et al. ......... 713/300 |
| 2006/0282692 A1 | 12/2006 | Oh |
| 2006/0283954 A1 | 12/2006 | Ralph et al. |
| 2006/0288243 A1 | 12/2006 | Kim |
| 2007/0070673 A1 | 3/2007 | Borkar et al. |
| 2007/0140574 A1 | 6/2007 | Yamaguchi et al. |
| 2007/0285698 A1 | 12/2007 | Wang et al. |
| 2008/0011855 A1 | 1/2008 | Nadabar |
| 2010/0078477 A1 | 4/2010 | Wang et al. |
| 2010/0108769 A1 | 5/2010 | Wang et al. |

\* cited by examiner

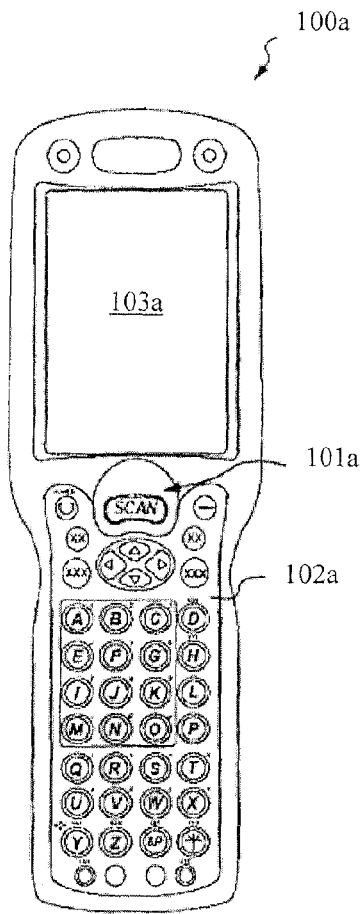
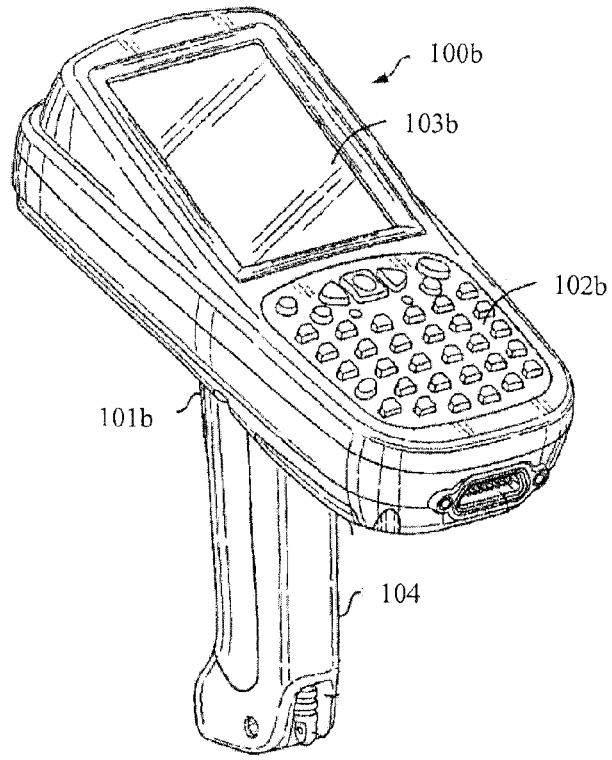
Fig. 1A
Fig. 1B

LOW POWER MULTI-CORE DECODER SYSTEM AND METHOD

TECHNICAL FIELD

The present invention relates to portable data terminals and more particularly, to portable data terminals configured to capture an image and decode any bar code contained in the image.

BACKGROUND INFORMATION

Portable data terminals (PDTs) such as laser indicia reading devices, optical indicia reading devices, barcode scanners and barcode readers, for example, typically read data represented by printed indicia such as symbols, symbology, and bar codes, for example. One type of symbol is an array of rectangular bars and spaces that are arranged in a specific way to represent elements of data in machine readable form. Optical indicia reading devices typically transmit light onto a symbol and receive light scattered and/or reflected back from a bar code symbol or indicia. The received light is interpreted by an image processor to extract the data represented by the symbol. Laser indicia reading devices typically utilize transmitted laser light. One-dimensional (1D) optical bar code readers are characterized by reading data that is encoded along a single axis, in the widths of bars and spaces, so that such symbols can be read from a single scan along that axis, provided that the symbol is imaged with a sufficiently high resolution.

In order to allow the encoding of larger amounts of data in a single bar code symbol, a number of one-dimensional (1D) stacked bar code symbologies have been developed which partition encoded data into multiple rows, each including a respective 1D bar code pattern, all or most all of which must be scanned and decoded, then linked together to form a complete message. Scanning still requires relatively higher resolution in one dimension only, but multiple linear scans are needed to read the whole symbol.

A class of bar code symbologies known as two-dimensional (2D) matrix symbologies have been developed which offer orientation-free scanning and greater data densities and capacities than 1D symbologies. 2D matrix codes encode data as dark or light data elements within a regular polygonal matrix, accompanied by graphical finder, orientation and reference structures.

Conventionally, a PDT includes a central processor which directly controls the operations of the various electrical components housed within the PDT. For example, the central processor controls detection of keypad entries, display features, wireless communication functions, trigger detection, and bar code read and decode functionality. More specifically, the central processor typically communicates with an illumination assembly configured to illuminate a target, such as a bar code, and an imaging assembly configured to receive an image of the target and generate an electric output signal indicative of the data optically encoded therein.

The output signal is generally representative of the pixel data transmitted by an image sensor of the imaging assembly. Because the pixel data may not be high enough quality for the processor to reliably decode the bar code in the image, PDTs generally successively capture images, or image frames, until a reliable decode is complete. Further, where the bar codes being decoded vary from 1D and 2D symbologies, the PDT generally sequentially executes decode algorithms for the multiple symbologies. This process can be time-intensive because the processor must wait for the pixel data to be stored in memory before it can access the data in order to execute a decode algorithm and then must further wait for a decode algorithm to complete before a second decode algorithm can execute. Further, in many settings such as warehouses, shopping centers, shipping centers, and numerous others, PDTs are used to decode bar codes in serial fashion such that a faster decode operation generally increases throughput.

Attempts have been made to increase decode speed particularly by multi-threading. Multi-threading, or hyperthreading, allows multiple threads to use a single processing unit by providing processor cycles to one thread when another thread incurs a latency such as a cache miss, for example, which would cause the processor to incur several cycles of idle time while off-chip memory is accessed. Using multithreading, the central processor idle time is minimized but not substantially parallelized. Further, context switching between threads can significantly increase overhead, as the state of one process/thread is saved while another is loaded, further minimizing any efficiency gain.

Accordingly, there remains a need in the art for a PDT system architecture that will allow for faster, substantially parallel, bar code decoding operations.

BRIEF DESCRIPTION OF THE DRAWINGS

The present invention is disclosed with reference to the accompanying drawings, wherein:

FIG. 1 is a plan view and a side perspective view of two exemplary PDTs.

Figure 2A:
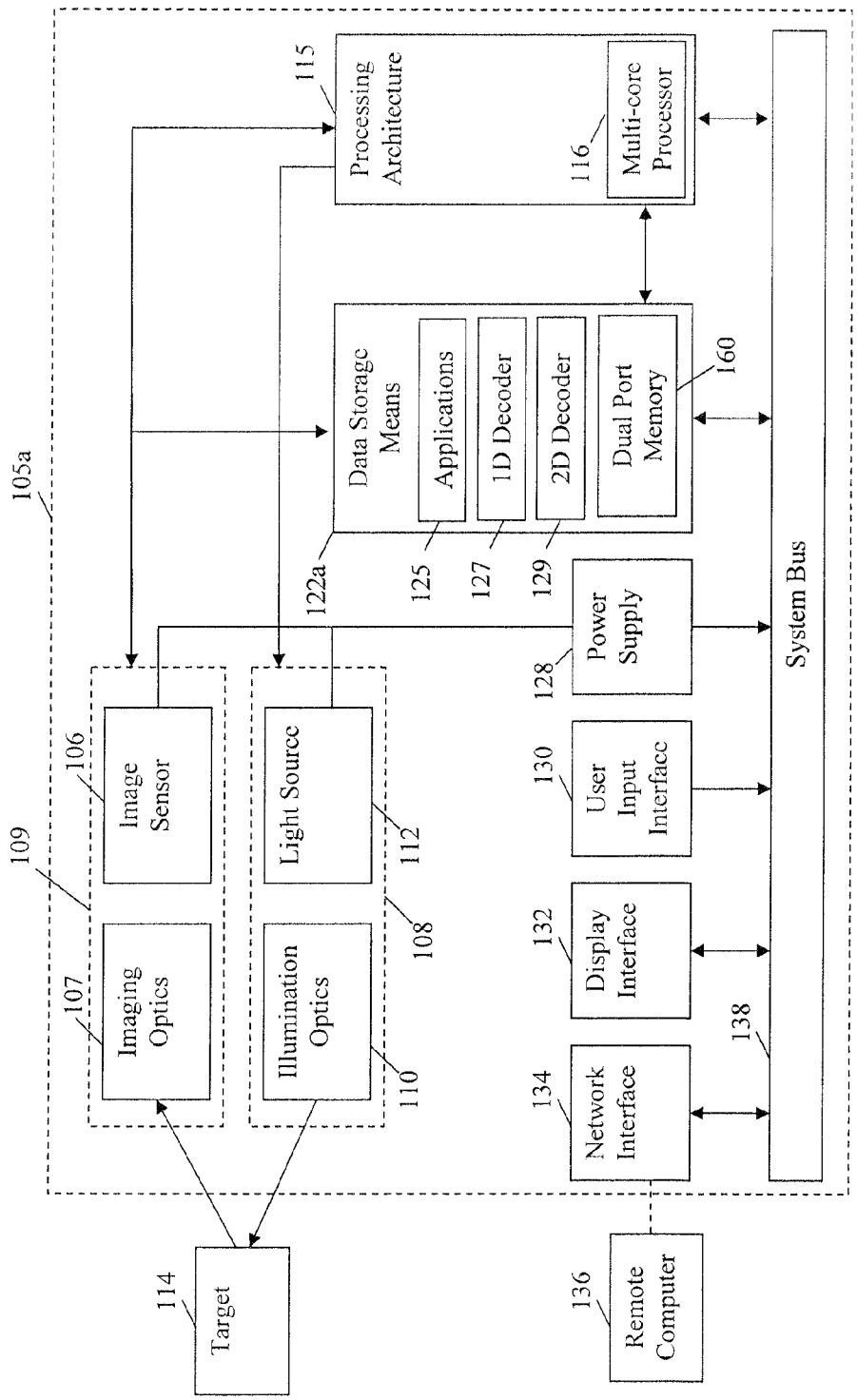
FIG. 2a is a block schematic diagram of an exemplary PDT according to the present invention.

It will be appreciated that for purposes of clarity and where deemed appropriate, reference numerals have been repeated in the figures to indicate corresponding features.

DETAILED DESCRIPTION

Referring to FIGS. 1A and 1B, two exemplary PDTs 100 for reading/scanning printed indicia are shown. The PDT housing can be shaped so as to fit comfortably into a human hand using a handle portion 104 and can include a finger actuatable scan/capture or trigger button 101 as well as a keypad 102 for inputting data and commands, power button, and antenna for facilitating communication with a local or remote host processor, for example. The PDT also includes a display 103, such as an LCD or OLED display, for example, for displaying information to the user. If the display 103 is a touch screen, a stylus (not shown) may also be included to facilitate interaction with the touch screen. An aperture in the housing is included such that the illumination 108 and imaging optics 109 have substantially unobstructed access to the target 114. The PDT can also include a power port for receiving a power supply as well as one or more communication ports for facilitating wired or wireless communication with a network interface 134. Although the present invention is described with respect to a PDT, the invention can be utilized in any bar code scanner, mobile device, mobile computer, or personal data assistant, for example.

Referring to FIG. 2, there is shown a block schematic diagram of the basic structures that together comprise a PDT 105 according to the present invention. The PDT 105 includes an illumination assembly 108 for illuminating a target 114, such as a bar code, and an imaging assembly 109 for receiving an image of the target 114 and generating an electric output signal indicative of the pixel data optically encoded therein. The illumination assembly 108 includes at least one light source 112 together with illumination optics 110, such as one or more reflectors, for directing light from the light source in the direction of the target 114. The light source 112 can include at least one LED configured to emit light in the near-infrared range and/or at least one LED configured to emit light in the visible range. The imaging assembly 102 includes a 2D image sensor 106, such as a CCD, CMOS, NMOS, PMOS, CID, or CMD solid state imagine sensor, along with imaging optics 107 for receiving and focusing an image of the target 114 onto the image sensor 106.

Figure 2B:
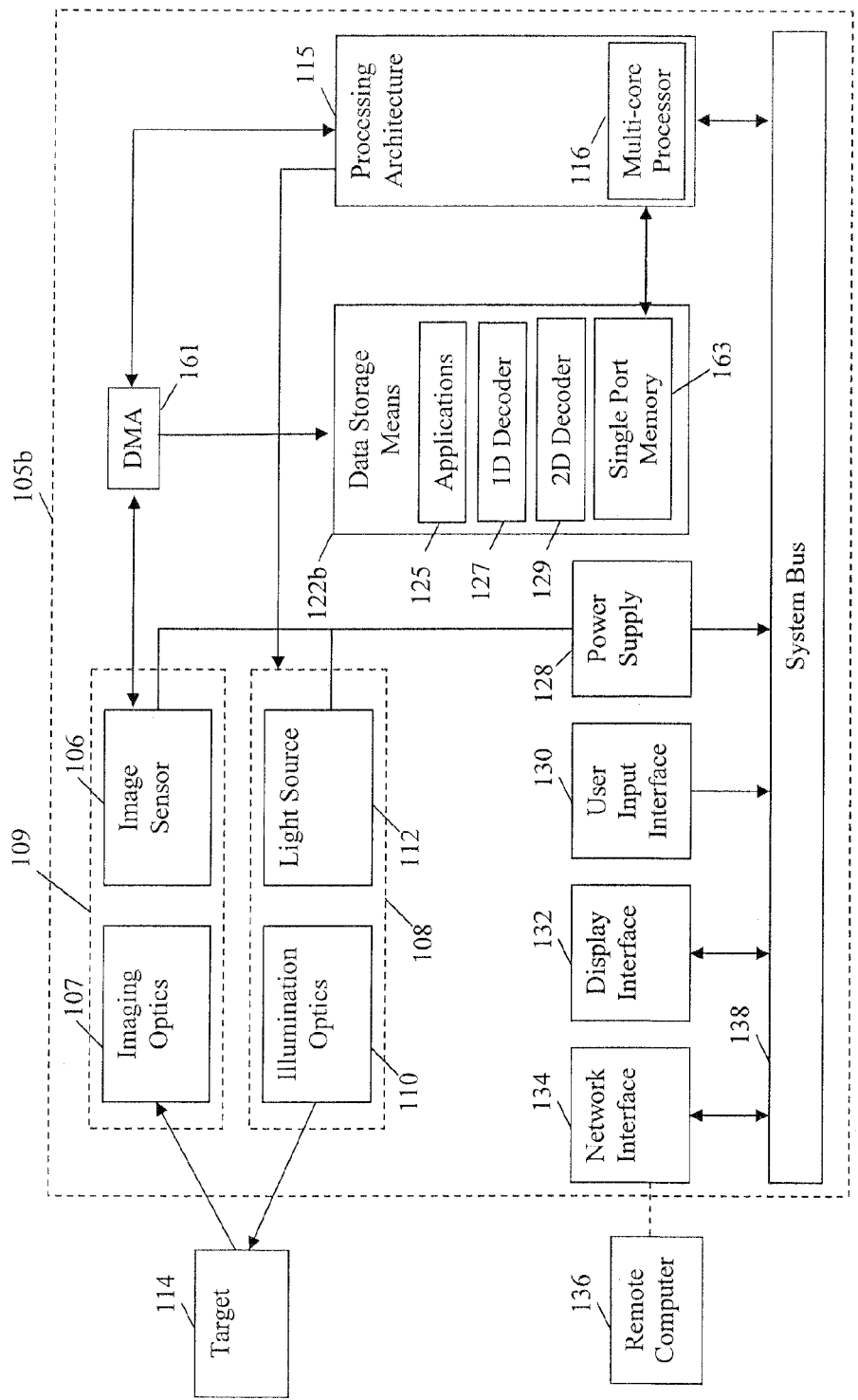
FIG. 2b is a block schematic diagram of an exemplary PDT according to the present invention.

Still referring to FIG. 2, the PDT 105 further includes a processing architecture 115 which controls the operation of the PDT 105 by implementing program instructions it retrieves from the data storage means 122. More specifically, the processing architecture 115 is configured to receive, output and process data, including image/pixel data, operate the imaging 109 and illumination 108 assemblies, and communicate with a system bus 138 among other operations. Further, the processing architecture 115 may be configured to control the illumination of the light source 112, the timing of the image sensor 106, analog-to-digital conversion, transmission and reception of data to and from a processor of a remote computer 136 external to the reader through a network interface 134, such as an RS-232, RS-485, USB, Ethernet, Wi-Fi, Bluetooth™, IrDA and Zigbee interface, control a user input interface to manage user interaction with a scan/trigger button 101 and/or keypad 102, and control an output device 103, such as an LCD or an OLED display, through the display interface 132. The processing architecture 115 includes at least one multi-core processor 116 as described in detail below with respect to FIGS. 3 and 5 but optionally can include an additional processor(s) or microprocessor(s) such as VLSI or ASIC integrated circuit microprocessor(s). In one embodiment shown in FIG. 2a the data storage means 122a includes at least one dual port memory module 160, such as RAM for example, described in detail below with respect to FIG. 4 but optionally can include additional memory modules such as local, network-accessible, removable and/or non-removable memory, such as RAM, ROM, and/or flash. In another embodiment shown in FIG. 2b, the data storage means 122b includes at least one single port memory module 163, such as RAM for example, in communication with a direct memory access (DMA) controller 161 as described further below. The data storage means 122 is shown as including applications 125, such as an operating system for example, a 1D decoder 127, and a 2D decoder 129. The decoders 127 and 129 include program instructions that, when executed by the multi-core processor 116, retrieve image pixel data and decode any bar code contained in the image as is known in the art. Although the decoders 127 and 129 are shown as separate from the dual port memory 160 in FIG. 2a, in another embodiment the decoder 127 and 129 program instructions are stored in the dual port memory 160. The PDT 105 also includes one or more power supplies 128, such as one or more batteries and/or circuitry for receiving an alternating current, and a user input interface 130 for receiving data from a user input device 102, such as a keyboard, keypad, and/or touch screen. The PDT 105 structures shown in FIG. 2 are preferably supported on one or more printed circuit boards (not shown).

Figure 3:
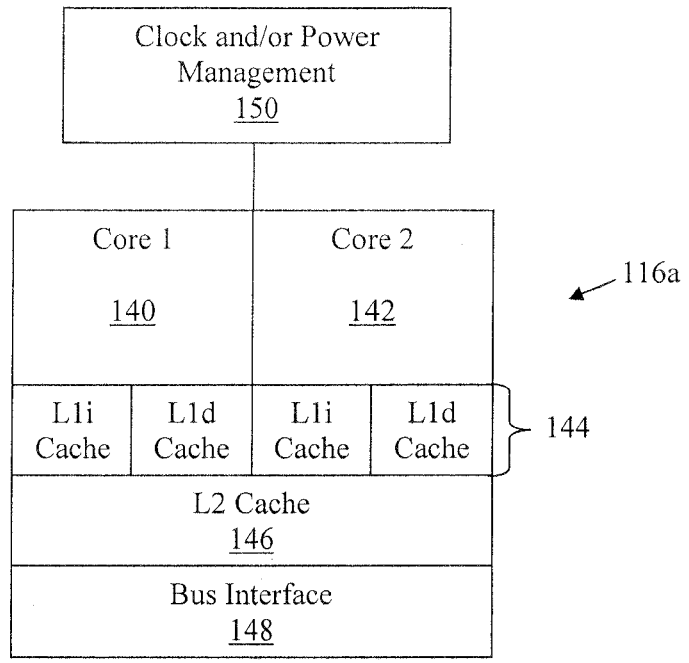
FIG. 3 is a block schematic diagram of an exemplary multi-core processor according to the present invention.

Referring to FIG. 3, a multi-core processor 116 according to the present invention is shown as a dual-core processor 116a having a first core 140 and a second core 142. The cores can also share one cache, or in a multilevel cache architecture, each utilize its own respective cache (e.g. L1) and share another cache (e.g. L2) or any combination thereof. In the embodiment shown in FIG. 3, a first level of cache 144 is shown as having instruction and data caches for each core 140, 142 and a second level of cache 146 is shown as being shared among both cores 140 and 142. The cores 140 and 142 can be integrated on the same integrated circuit die or they can be integrated onto multiple dies in the same integrated circuit package as is known in the art. Further, the processor 116 can also include one or more independent or shared bus interfaces such as a shared bus interface 148 for communication with a system bus and/or the data storage means 122. Each core 140 and 142 has its own processing unit and is capable of issuing instructions transmitted through the bus interface to a bus as well as simultaneously performing operations.

Figure 4:
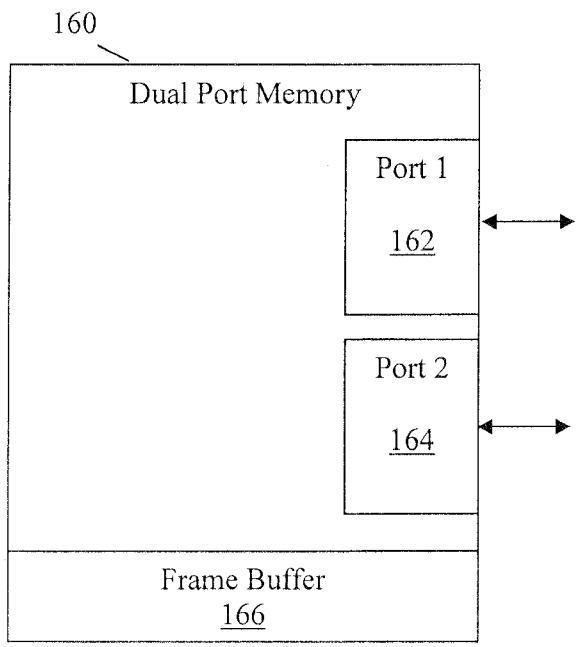
FIG. 4 is a block schematic diagram of an exemplary dual port memory module according to the present invention.

Referring to one embodiment shown in FIGS. 2a and 4, dual port memory 160 is shown as including a first port 162 and a second port 164. At least a portion of the dual port memory, identified as frame buffer 166 in FIG. 4, is configured to store image frame data as received from the image sensor. Dual port memory, such as the dual port memory described by U.S. Pat. No. 5,276,842 to Sugita, incorporated herein by reference, is preferably configured to be accessed by two cores simultaneously on the same clock. Contention issues are preferably handled by arbitration system or arbitration logic as is known in the art and as one exemplary implementation of an arbitration system is also described in the '842 patent. Dual port memory can also be implemented with a single port memory core as taught by Balasubramanian et al. in U.S. Pat. No. 7,349,285, incorporated herein by reference, whereby access requests are processed on both the high and low logic states of the memory clock cycle.

In an exemplary operation, the processing architecture 115 retrieves program instructions from data storage means 122a, over system bus 138, which the architecture implements to control the illumination assembly 108 to focus light on a target 114 containing a bar code and imaging assembly 109 to receive the reflected light. The image sensor 106 then transmits output signals, representative of pixel data of the captured image, to the first port 162 of the dual port memory 164 where it is stored in a frame buffer 166. Each of the first core 140 and the second core 142 can then access the frame buffer 166 and retrieve the pixel data. To allow for parallel decoding, the first core 140 can be configured to execute the program instructions of the 1D decoder and the second core 142 can be configured to execute the program instructions of the 2D decoder. Accordingly, whether the image contains a 1D or 2D bar code, decoding can occur at substantially the same time decreasing the time required for a successful decode. Further, image pixel/frame data can be stored in the dual port memory 160 on the same clock cycle as image pixel/frame data is being retrieved by the first core 140 and/or the second core 142. PDT 105 can be configured to continuously image the target 114 and store the pixel data, or each frame, in the frame buffer and the cores 140 and 142 can continually process the image frame data, in parallel, until a successful decode event occurs. Upon successful decode, the decoded data is optionally transmitted to the data storage means 122 where it can be accessed, for example, by an application 125.

In another embodiment, the first core is configured to execute 1D decoder 127 program instructions as well as image quality filter program instructions stored in data storage means 122. When executed by the first core 140, the image quality filter program instructions analyze, in real time, the pixel data/each frame retrieved by the core from the frame buffer for quality with respect to contrast, for example. The frame can then be assigned an image quality score which can be factored into a decode algorithm's decision with respect to selecting the highest image quality score frame available in the frame buffer. Further, the image quality filter program instructions can be configured to interrupt an existing decode 127 process which is decoding a frame/image with a low image quality score should a frame/image with a higher image quality score be captured.

In yet another embodiment, the first core 140 is configured to execute image quality filter program instructions, or any other program instructions related to image processing, for example, stored in data storage means 122 and the second core 142 is configured to execute 1D decoder 127 program instructions as well as 2D decoder program instructions 129.

Figure 5:
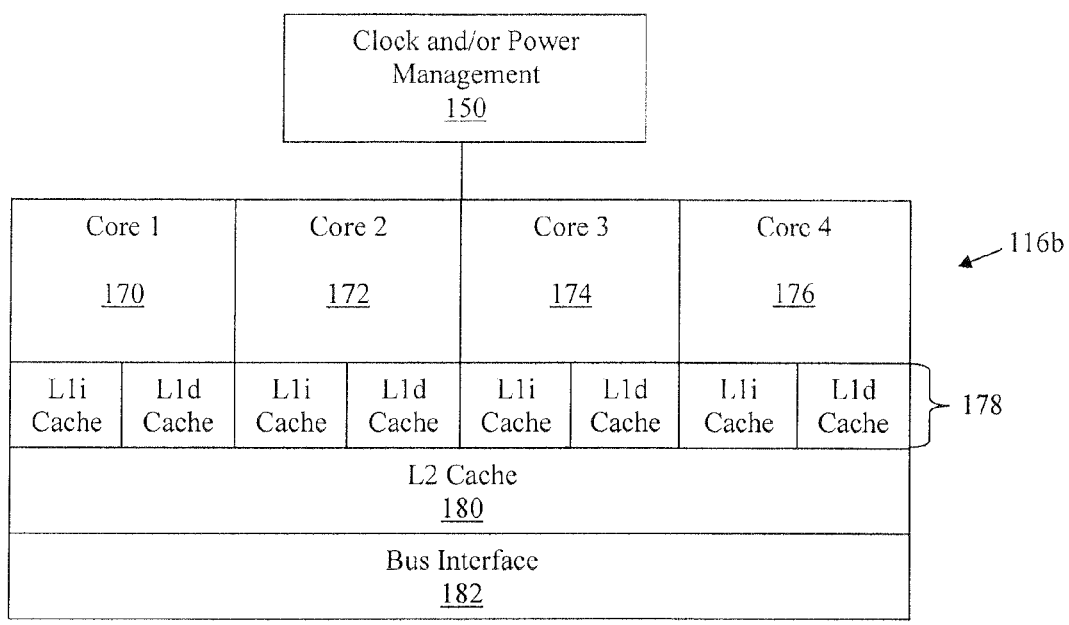
FIG. 5 is a block schematic diagram of an exemplary multi-core processor according to the present invention.

Referring to FIG. 5, another embodiment is shown wherein the multi-core processor is a quad-core processor further including a third core and a fourth core as well as a first cache level 178, a second shared cache level 180 and a bus interface 182. A quad-core processor 116b generally refers to four processing units or cores 170, 172, 174 and 176 manufactured on the same integrated circuit. In this embodiment, the third core 174 can be configured to execute the program instructions of the image quality filter and the fourth core 176 can execute program instructions related to communication with the network interface 134. Accordingly, the user does not have to wait to pull the trigger or press the scan button again until the first or second core has executed communication routines to transmit the decode results, for example through the network interface 134 to a remote computer 136, because the fourth core 176 can handle communication with the network interface 134 in parallel with the first and/or second core causing the PDT 105 to capture a new image and begin a new process of decoding any bar code contained in the image.

Referring to FIG. 2b, although the invention has thus far been described as including a dual port memory module, in another embodiment the data storage means 122b includes a single port memory 163 configured to store a frame buffer. In this embodiment, preferably a DMA controller 161 is included as being in communication with the imaging assembly 109, the processing architecture 115 and the data storage means 122b. The DMA controller 161 can off-load the processor by transferring pixel data from the image sensor 106 directly to the single port memory 163 without involving the processing architecture 115 including the multi-core processor 116. Accordingly, processor cycles that otherwise would be used to manage a frame buffer can instead be used to run decode 127, 129 algorithms and/or otherwise as described above, While the present invention substantially reduces the time required for a successful decode, it can also effectively manage the system clock and/or the power supplied to each core to reduce overall power consumption. Particularly in PDTs that are mostly powered by battery, power consumption is a concern because the greater the power dissipated, the faster the remaining battery life is reduced. Accordingly, and as shown in FIGS. 3 and 5, a clock management module/logic 150 configured to dynamically vary the clock speed received by each respective core based on the workload/utilization of each core and/or a power management module/logic 150 configured to dynamically vary the voltage received by at least a portion of each core can be utilized to manage resources consumed by the multi-core processor 116b. One method of power management is described in U.S. patent application Ser. No. 11/238,489 to Borkar et al., incorporated herein by reference, as including voltage regulators to supply power to each core or a part of a core depending on a number of factors including activity, core temperature, transient current consumption, and reliability. Another method of power management has been described by Kim in U.S. patent application Ser. No. 11/424,080, incorporated herein by reference, which includes modulating the mode of the processor to single core or multi-core depending on a number of factors including whether the PDT is connected to AC or battery power, remaining battery level, available memory, and memory usage. One exemplary clock management module is disclosed by Naveh et al. in U.S. patent application Ser. No. 10/899,674, incorporated herein by reference, wherein the clock management module utilizes independent clock throttle settings for each core, independent clock throttle of various functional blocks of one or more core's internal architecture such as reorder buffers and reservation station tables, for example, and scaling the clock frequency of the bus that the multi-core processor uses to communicate with system components.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A portable data terminal, comprising:
a multi-core processor having at least a first core and a second core;
at least one illumination assembly and at least one imaging assembly; and
data storage means configured to store a plurality of program instructions, the program instructions including at least one one-dimensional decoder and at least one two-dimensional decoder; and
wherein the first core of the multi-core processor executes the one-dimensional decoder and the second core executes the two-dimensional decoder
wherein the one-dimensional decoder and two-dimensional decoder run synchronously in parallel.

2. The portable data terminal of claim 1, wherein the data storage means further includes at least one multi-port memory module having at least a first port and a second port, the at least one multi-port memory module being configured to receive output signals from the imaging assembly and communicate with the multi-core processor.

3. The portable data terminal of claim 2, wherein the imaging assembly further includes imaging optics and an image sensor and the illumination assembly further includes illumination optics and at least one light source.

4. The portable data terminal of claim 3, wherein the first port is configured to receive at least one output signal from the imaging assembly, the output signals representing pixel data transmitted by the image sensor, and the second port is configured to communicate with the multi-core processor.

5. The portable data terminal of claim 4, wherein the receipt of the at least one output signals and the communication with the multi-core processor both occur on the same clock cycle.

6. The portable data terminal of claim 1, further including a power supply, at least one system bus, a network interface, a display interface, and a user input interface.

7. The portable data terminal of claim 1 further including at least one management module selected from the group consisting of a clock management module configured to dynamically vary the clock speed received by each respective core based on the workload of each core and a power management module configured to dynamically vary the voltage received by at least a portion of each core.

8. The portable data terminal of claim 1, wherein the multi-core processor further includes a bus interface and at least one level of cache.

9. The portable data terminal of claim 1, further including a first level of cache and a second level of cache, the first level including an instruction cache and a data cache for each core and the second level being shared among all the cores.

10. The portable data terminal of claim 1, wherein the multi-core processor further includes a third core and a fourth core.

11. The portable data terminal of claim 10, wherein the program instructions stored in the data storage means further includes an image quality filter.

12. The portable data terminal of claim 11, further including a network interface selected from the group consisting of RS-232, RS-485, USB, Ethernet, Wi-Fi, IrDA and Zigbee.

13. The portable data terminal of claim 12, wherein the third core of the multi-core processor executes the image quality filter and the fourth core of the multi-core processor communicates with the network interface.

14. The portable data terminal of claim 1, further including a direct memory access controller in communication with the imaging assembly, multi-core processor and data storage means and wherein the data storage means further includes at least one single port memory module.

15. A method of decoding a bar code, comprising:
providing a portable data terminal having a multi-port memory and a multi-core processor;
capturing an image of a target;
transferring image pixel data to one port of the multi-port memory; and executing program instructions stored in the multi-port memory concurrently on a first core of the multi-core processor so as to decode any one-dimensional bar code represented by the pixel data and on a second core of the multi-core processor so as to decode any two-dimensional bar code represented by the pixel data,
wherein the one-dimensional decoding and two-dimensional decoding run synchronously in parallel.

16. The method of claim 15, wherein the executing step further includes executing program instructions stored in the multi-port memory on a third core of the multi-core processor so as to analyze the pixel data for image quality.

17. The method of claim 16, wherein the executing step further includes executing program instructions stored in the multi-port memory on a fourth core of the multi-core processor so as to communicate with a network interface selected from the group consisting of an RS-232, RS-485, USB, Ethernet, Wi-Fi, IrDA and Zigbee interface.

18. A system of capturing an image and decoding any bar code in the image, comprising:
a multi-core processor having at least a first core and a second core;
a data storage means including at least one multi-port memory having at least a first port and a second port, the multi-port memory being in communication with at least one core of the multi-core processor;
at least one illumination assembly and at least one imaging assembly, the imaging assembly being configured to transmit image pixel data to the multi-port memory; and
wherein the data storage means comprises software including a one-dimensional decoder and a two-dimensional decoder that when executed causes each of the first and second cores of the multi-core processor to perform a respective method comprising:
decoding any one-dimensional bar code represented by the pixel data; and
decoding any two-dimensional bar code represented by the pixel data
wherein the one-dimensional decoding and two-dimensional decoding run synchronously in parallel.

19. The system of claim 18, further including a network interface and wherein the multi-core processor further includes a third core and a fourth core and wherein the data storage means further comprises software including an image quality filter and at least one network communication routine that when executed causes the third and fourth cores of the multi-core processor to perform a respective method comprising:
analyze the pixel data for image quality; and
communicate with the network interface.

* * * * *